United States Patent [19]

Rich et al.

[11] 4,287,218

[45] Sep. 1, 1981

[54] READY-TO-EAT MOLDED MEAT PRODUCT

[76] Inventors: Norman I. Rich, 3501 15th St. Ct., Rock Island, Ill. 61201; Martin D. Rich, 6235 Crow Valley Dr., Bettendorf, Iowa 52722

[21] Appl. No.: 679,186

[22] Filed: Apr. 22, 1976

Related U.S. Application Data

[63] Continuation-in-part of Ser. No. 618,350, Oct. 1, 1975, abandoned.

[51] Int. Cl.³ .......................... A23L 1/31; A22C 17/00
[52] U.S. Cl. ..................................... 426/272; 426/274; 426/281; 426/404; 426/407; 426/412; 426/513; 426/646
[58] Field of Search ............... 426/272, 273, 274, 296, 426/281, 513, 523, 652, 646, 92, 517, 402, 407, 401, 404, 412, 414

[56] References Cited

U.S. PATENT DOCUMENTS

| 2,779,681 | 1/1957 | Sell et al. ........................ 426/513 X |
| 3,235,389 | 2/1966 | Hertwig et al. ...................... 426/404 |
| 3,411,922 | 11/1968 | Eder ................................ 426/407 X |
| 3,432,311 | 3/1969 | Gruner ............................ 426/646 X |
| 3,563,764 | 2/1971 | Posegabe ......................... 426/272 X |
| 3,638,554 | 2/1972 | Ackroyd ........................... 426/513 X |
| 3,663,233 | 5/1972 | Keszler ............................... 426/281 |
| 3,679,434 | 7/1972 | Bard et al. .......................... 426/272 |
| 3,689,284 | 9/1972 | Nash et al. .......................... 426/272 |
| 3,695,892 | 10/1972 | Reinke ................................. 426/281 |
| 3,740,235 | 6/1973 | Weiher ............................ 426/513 X |
| 3,853,999 | 12/1974 | Kenbor ........................... 426/513 X |
| 3,890,451 | 6/1975 | Keszler ............................ 426/513 X |
| 3,987,209 | 10/1976 | Gatineau et al. ................ 426/513 X |

Primary Examiner—Kenneth M. Schor
Attorney, Agent, or Firm—Shlesinger, Arkwright, Garvey & Dinsmore

[57] ABSTRACT

Whole pieces of injected and tumbled meat are layered into the bottom of a preformed mold and covered with a mixture of ground meat. Alternatively, ground meat is mixed with additives and/or an emulsion and placed in the mold. The mold is then sealed and air evacuated therefrom. The product is cooked under a vacuum, following which it may be removed from the mold, drained, and repackaged for distribution and sale.

19 Claims, 2 Drawing Figures

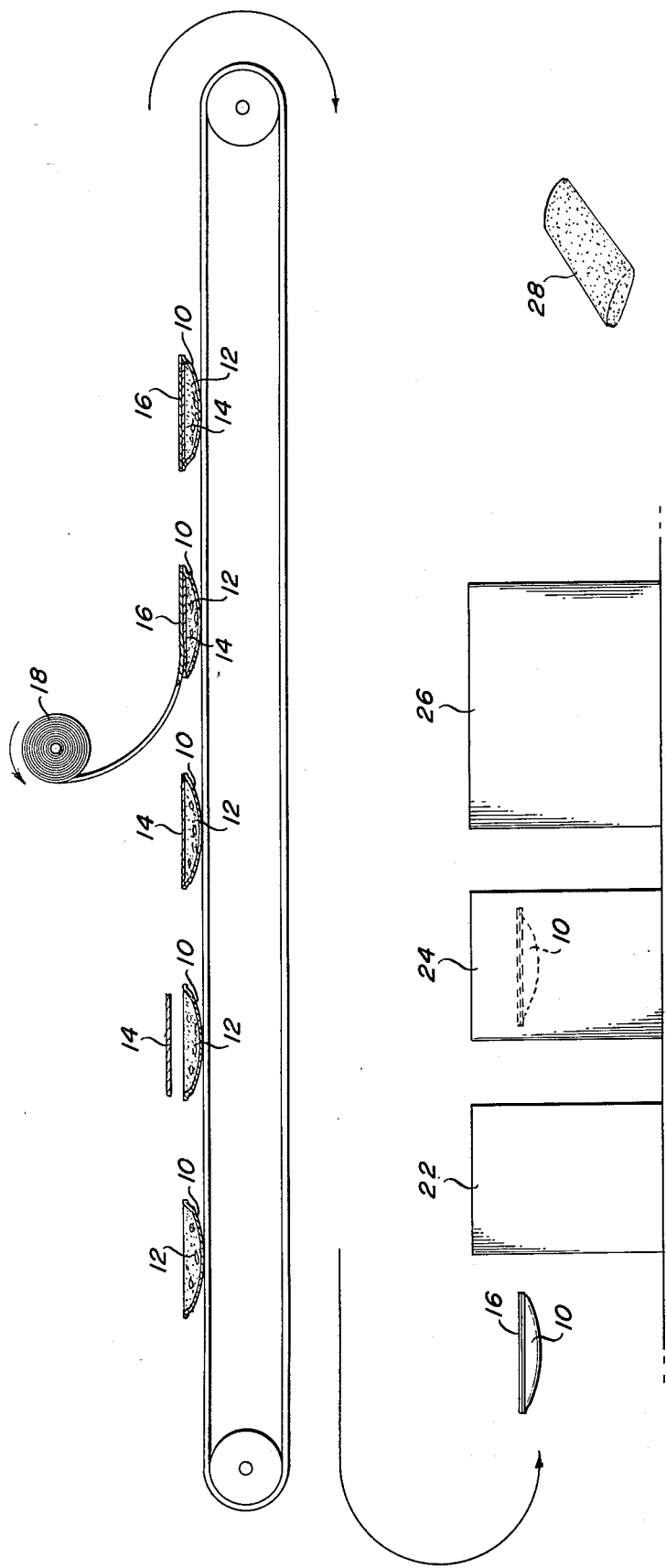

READY-TO-EAT MOLDED MEAT PRODUCT

This application is a continuation-in-part of application Ser. No. 618,350, filed Oct. 1, 1975, now abandoned.

BACKGROUND OF THE INVENTION

In previously filed application Ser. No. 618,350, there is disclosed a process for manufacturing ready-to-eat molded meat products made from bovine, porcine, ovine or avian species. In accordance with that process, whole pieces of meat, either treated or untreated, are arranged in a semi-rigid sealed mold, following which the mold is evacuated of air and the product cooked in the vacuum state. The product is then drained and then repackaged for distribution and sale.

SUMMARY OF THE INVENTION

The present invention is a process for manufacturing a line of ready-to-eat molded meat products from a mixture of whole meat pieces and ground meat or ground meat alone as the basic ingredient thereof, and in which various additives and emulsions are selectively mixed therewith in order to improve the quality of the end product. After initial preparation of the meat, additives and emulsions, the product is placed in a mold from which air is evacuated, following which the product is cooked while under a vacuum.

The present process provides an economical process for manufacturing a line of quality products employing different ingredients, but wherein, after the ingredients are placed in a mold, the procedural steps of evacuating air from the product and cooking the product, are the same. Consequently, the end product is of increased yield, having superior flavor, texture, appearance and tenderness than has heretofore been possible with like products.

The present process contemplates the mixing together of ground meat by itself or with whole pieces of various sizes of bovine, porcine, ovine or avian species, and the selective addition of broth solutions, spice mixes and meat emulsions in order to produce a meat product of high, yet varying, quality.

DESCRIPTION OF FIGURES OF THE DRAWINGS

FIG. 1 is a schematic view illustrating the steps of the process of the present invention; and FIG. 2 is a perspective view of the molded product made in accordance with the present process.

DETAILED DESCRIPTION OF THE INVENTION

The process of the present invention relates to boneless, ready-to-eat molded meat products, which process is equally applicable to bovine, porcine, ovine or avian species. For illustration purposes, the drawing discloses the application of the present invention to the manufacture of a molded ready-to-eat turkey product, although the same process is equally applicable to other species of meat.

With reference to the drawing, whole pieces of injected and tumbled meat ranging in weight from eight ounces to four pounds are layered into the bottom of a preformed mold and covered with a mixture that has been blended of ground meat containing solution, additives and/or emulsion. The whole meat pieces are injecto pumped with an aqueous solution and tumbled to draw the protein to the surface of the meat as described in application Ser. No. 618,350 in order to effect adherence of the whole meat pieces together and with the ground meat.

An example of the injecting of the whole meat pieces is as follows:

| INGREDIENTS | |
| --- | --- |
| Turkey Meat | 100 pounds |
| Injected Solution | 10 pounds |
| Sodium Chloride | ½ pound |
| COMPOSITION OF INJECTED SOLUTION | |
| Turkey Broth | 80 to 90 parts |
| NaCl | 7 to 13 parts |
| Sodium Phosphate | 1 to 3 parts |
| Flavorings | .072 to 1 part |

The whole turkey meat pieces, either breast, thigh meat or combination thereof is injecto-pumped with this solution to 110 percent of the original weight. The meat pieces are then tumbled with dry salt for twenty-five minutes with the ground meat until the surface of the meat has a thick creamy film of protein exudate.

In the alternative, ground meat alone is used and this is mixed together with or without additives, broth solution or a ground meat emulsion prior to placement in a semi-rigid mold 10 made of 7 mil nylon/saran/poly laminated film approximately 4¾ inches wide, 6 inches long and 3½ inches deep. The mixture is indicated at 12. A board 14 is placed over the meat mixture and a non-forming top web 16 from a continuous roll 18 of 2.6 mil laminated nylon/saran/poly is placed over the open cavity for sealing the latter. The mold is carried by a conveyor 20 or transferred in any other suitable manner to a vacuum chamber 22. The application of the vacuum effects evacuation of 50% to 100% of the air within the mold and causes a film 16 to be drawn into sealing engagement with the upper edges of mold 10. The application of the vacuum additionally effects elimination of air holes, jelly pockets and voids between the meat pieces and effects increased cohesion of the ground meat pieces together or with the larger meat pieces, this effect being sufficient to prevent crumbling of the finished meat product when sliced.

The vacuum sealed product is next removed from the vacuum chamber and may be transferred to a water bath 24 having a temperature of 150°–250° F. in order to effect shrinking of mold 10 and film 16 into tight engagement with the meat to thereby hold the molded product shape. The meat is next transferred into a cooking chamber 26 where the product is cooked to a temperature of about 160°.

After cooking is completed, the cooked product 28, which is of substantially loaf shape, is cooled below 120° F., following which mold 10 and film 16 are removed and all free excess moisture drained from the product. The product is then repackaged, vacuum sealed and placed in a carton for storage at an appropriate temperature prior to shipping for sale.

The process of the present invention may be carried out in accordance with the following examples, illustrating the invention as applied to a turkey product. However, the process is equally applicable for use in connection with other species of meat.

EXAMPLE I

Class of product that contains approximately half skin-on pumped met and half ground mixed meat.

| | |
|---|---|
| Pumped skin-on or skinless meat | 50 pounds |
| Ground mixed meat | 50 pounds |
| Formula for pumped skin-on meat: | |
| Turkey | 100 parts |
| Solution A | 5-10 parts |
| Formula for ground portion: | |
| Turkey | 100 parts |
| Solution A | 5-10 parts |
| Formula of Solution A: | |
| Turkey Broth | 80-90 parts |
| Salt | 5-15 parts |
| Spice A | 1-5 parts |
| Formula for Spice Mix A: | |
| Sodium Phosphates | 90-98 parts |
| Flavorings | 2-5 parts |

EXAMPLE II

Class of product that contains all ground meat and no emulsion:

| | |
|---|---|
| Turkey | 100 parts |
| Solution A | 5-10 parts |

Turkey is ground and mixed with solution.

EXAMPLE III

Class of product that contains all ground meat and no emulsion:

| | |
|---|---|
| Turkey | 100 parts |

Turkey is ground and mixed—no additives.

EXAMPLE IV

Class of product that contains processed, all ground meat with no additives.

| | |
|---|---|
| Ground Turkey | 85-75 parts |
| Turkey Broth | 3-7 parts |
| Phosphate Solution B | 1-1.7 parts |
| Spice Mix B | 1-1.5 parts |
| Emulsion A | 8-19 parts |
| Formula for Phosphate Solution B: | |
| Turkey Broth | 80-90 parts |
| Sodium Phosphates | 5-15 parts |
| Formula for Spice Mix B: | |
| Salt | 90-97 parts |
| Flavorings | 3-9 parts |
| Formula for Emulsion A: | |
| Turkey Skin | 0-60 parts |
| Turkey | 25-97 parts |
| Phosphate Solution | 1.5-2.0 parts |
| Salt | .5-1.5 parts |
| Turkey Broth | 0-12 parts |

The meat product made in accordance with the above examples has been found to be economical to manufacture, affords a line of meat products of varying grades, all of which are characterized by improved flavor and juiciness, and the texture and appearance of natural whole meat pieces. Additionally, the yield of cooked meat is increased.

Furthermore, although formed by many different pieces of whole meat and ground meat together with various additives, the molded product thereby formed, by virtue of the application of a vacuum thereto during the cooking cycle, causes the ingredients to adhere together, with the result that the end product will not fall apart during slicing.

While there has been herein shown and described the presently preferred form of this invention, it is to be understood that such has been done for purposes of illustration only, and that various changes may be made therein within the scope of the appended claims.

We claim:

1. A process for preparing a ready-to-eat meat product comprising the steps of:
   (a) grinding meat of bovine, ovine, porcine or avian species into small pieces
   (b) mixing the ground meat pieces together to draw protein to the surface thereof
   (c) mixing the ground meat pieces with a meat broth solution
   (d) placing the mixed, ground meat pieces in an open mold
   (e) laying a flexible film over the open portion of the mold
   (f) applying a sufficient vacuum to the interior of the mold to draw the flexible film into sealing engagement with that part of the mold defining the open portion thereof, such that the air holes and voids between the meat pieces are eliminated and the meat pieces are caused to adhere together, and
   (g) cooking the molded meat while under said vacuum.

2. The process of claim 1, wherein:
   (a) said meat broth solution is mixed with the ground meat in the proportion of approximately 5 to 10 parts meat broth solution to 100 parts ground meat.

3. The process of claim 1, wherein:
   (a) said meat broth solution comprises meat broth, salt and a spice mix.

4. The process of claim 3, wherein:
   (a) said meat broth solution comprises 80 to 90 parts meat broth, 5 to 15 parts salt and 1 to 5 parts spice mix.

5. The process of claim 3, wherein:
   (a) said spice mix comprises 90 to 98 parts sodium phosphates and 2 to 5 parts flavorings.

6. A process for preparing a ready-to-eat meat product comprising the steps of:
   (a) grinding meat of the bovine, ovine, porcine or avian species into small pieces,
   (b) mixing the ground meat pieces together to draw protein to the surface thereof
   (c) mixing the ground meat pieces with turkey broth, a phosphate solution, a spice mix and a meat emulsion
   (d) placing the mixed ground meat pieces in an open mold
   (e) laying a flexible film over the open portion of the mold
   (f) applying a sufficient vacuum to the interior of the mold to draw the flexible film into sealing engagement with that part of the mold defining the open portion thereof, such that the air holes and voids between the meat pieces are eliminated, and
   (g) cooking the molded meat while under said vacuum.

7. The process of claim 6, which includes:

(a) 75 to 85 parts ground meat, 3 to 7 parts turkey broth, 1 to 1.7 parts phosphate solution, 1 to 1.5 parts spice mix and 8 to 19 parts emulsion.

8. The process of claim 6, wherein:
(a) said phosphate solution includes 80 to 90 parts turkey broth and 5 to 15 parts sodium phosphates.

9. The process of claim 6, wherein:
(a) said spice mix includes 90 to 97 parts salt and 3 to 9 parts flavorings.

10. The process of claim 6, wherein:
(a) said meat emulsion includes 0 to 60 parts skin, 25 to 97 parts meat, 1.5 to 2.0 parts phosphate solution, 0.5 to 1.5 parts salt and 0 to 12 parts turkey broth.

11. A process for preparing a ready-to-eat meat product comprising the steps of:
(a) grinding meat of the bovine, ovine, porcine or avian species into small pieces
(b) mixing the ground meat pieces together to draw protein to the surface thereof
(c) mixing the ground meat pieces with meat broth, soy protein, spice mix and meat emulsion
(d) placing the mixed ground meat pieces in an open mold
(e) laying a flexible film over the open portion of the mold
(f) applying a sufficient vacuum to the interior of the mold to draw the flexible film into sealing engagement with that part of the mold defining the open portion thereof, such that the air holes and voids between the meat pieces are eliminated and the meat pieces are caused to adhere together, and
(g) cooking the molded meat while under said vacuum.

12. The process of claim 11, which includes:
(a) 50 to 70 parts meat, 10 to 18 parts meat broth, 2 to 3 parts soy protein, 1 to 2 parts spice mix, and 15 to 20 parts meat emulsion.

13. The process of claim 12, wherein:
(a) said spice mix includes 90 to 98 parts sodium phosphates and 2 to 5 parts flavorings.

14. The process of claim 12, wherein:
(a) said meat emulsion includes 0 to 60 parts skin, 25 to 97 parts meat, 1.5 to 2.0 parts phosphate solution, 0.5 to 1.5 parts salt and 0 to 12 parts turkey broth.

15. A process for preparing a ready-to-eat meat product comprising the steps of:
(a) grinding meat of the bovine, ovine, porcine or avian species into small pieces
(b) mixing the ground meat pieces together to draw protein to the surface thereof
(c) placing the mixed, ground meat pieces in an open mold made of a temperature responsive plastic material
(d) laying a flexible film over the open portion of the mold
(e) applying a sufficient vacuum to the interior of the mold to draw the flexible film into sealing engagement with that part of the mold defining the open portion thereof, such that the air holes and voids between the meat pieces are eliminated and the meat pieces are caused to adhere together
(f) subjecting the mold containing ground meat pieces to a hot water bath after air is evacuated from the mold, to effect shrinkage of the mold into tight engagement with the meat pieces for retaining the molded meat shape, and
(g) cooking the molded meat while under said vacuum.

16. A process for preparing a ready-to-eat meat product comprising the steps of:
(a) mixing a meat broth solution with injecto-pumped tumbled whole meat pieces
(b) mixing a meat broth solution with ground meat pieces
(c) placing a layer of the whole meat pieces mixed with meat broth solution in the bottom of a preformed, open mold
(d) placing a mixture of ground meat pieces mixed with meat broth solution on top of the layered whole meat pieces
(e) laying a flexible film over the open portion of the mold
(f) applying a sufficient vacuum to the interior of the mold to draw the flexible film into sealing engagement with that part of the mold defining the open portion thereof, such that the air holes and voids between the meat pieces are eliminated and the meat pieces are caused to adhere together, and
(g) cooking the meat while under said vacuum.

17. The process of claim 16, wherein:
(a) said meat broth solution comprises meat broth, salt and a spice mix.

18. The process of claim 17, wherein:
(a) said meat broth solution comprises 80 to 90 parts meat broth, 5 to 15 parts salt, and 1 to 5 parts spice mix.

19. The process of claim 18, wherein:
(a) said spice mix comprises 90 to 98 parts sodium phosphates and 2 to 5 parts flavorings.

* * * * *